Feb. 14, 1956 L. W. IMM 2,734,791

MONITORIAL RECORDER

Filed March 13, 1951

INVENTOR
Lewis W. Imm
BY
Naylor and Lassagne
ATTORNEYS

United States Patent Office 2,734,791

Patented Feb. 14, 1956

2,734,791

MONITORIAL RECORDER

Lewis W. Imm, Los Angeles, Calif., assignor to Librascope, Incorporated, Glendale, Calif., a corporation of California Application March 13, 1951, Serial No. 215,300

8 Claims. (Cl. 346—17)

The present invention relates to recorders of the type having a stylus arm which gradually moves radially with respect to and in synchronism with a slowly rotated record card in a manner normally to produce an undeviating spiral line on the card. More specifically, the invention is related to recorders of the type stated which embody means for causing deviating movement, or movements, of the stylus arm through an extraneous impulse imparted thereto from a distant point, as, for instance, a watchman's report station or check point.

The principal object of the invention is to combine electrically operated means with a recorder of the type stated, for detecting failure at any one of a plurality of check points to record a report or impulse from such point at certain predetermined intervals in the course of the stylus record, as, for instance, when a watchman fails to actuate a station switch before a certain hour or minute timed to the position of the stylus on the record card. Another object is to incorporate this added function in a recorder of the type referred to without necessitating any material structural alteration of the recorder mechanism other than the record card.

The foregoing objects are achieved by providing an auxiliary alarm circuit which includes the record plate and the stylus arm and marker point. This circuit is normally broken by the record card interposed between the marker point and record plate, but, as the salient feature of this invention, is provided with perforations at predetermined points in its circumference to permit the circuit to be closed through contact of the marker point with the record plate at such points, and which points can be avoided by deviation of the stylus at the proper time.

The disclosure herein made illustrates the auxiliary alarm circuit control in connection with a recorder having means for causing a plurality of distinguishably different deviations of the marker arm, as in the present inventor's co-pending joint application for patent, Serial No. 179,356, filed August 14, 1950, Patent No. 2,684,280, but it is equally applicable to any recorder of the type which includes means for causing lateral deviation of the record arm through an impulse transmitted from a check station. Examples are recorders such as are disclosed in the patent to Williamson No. 1,255,968 to Sprague No. 1,322,148, and to Cool No. 2,051,986.

In the prior application cited the stylus arm is subject to lateral movements of varying amplitude through impulses transmitted from three different check points. The invention is accordingly disclosed as related to a recorder of that type, as illustrated in the accompanying drawings, where:

Figure 1:
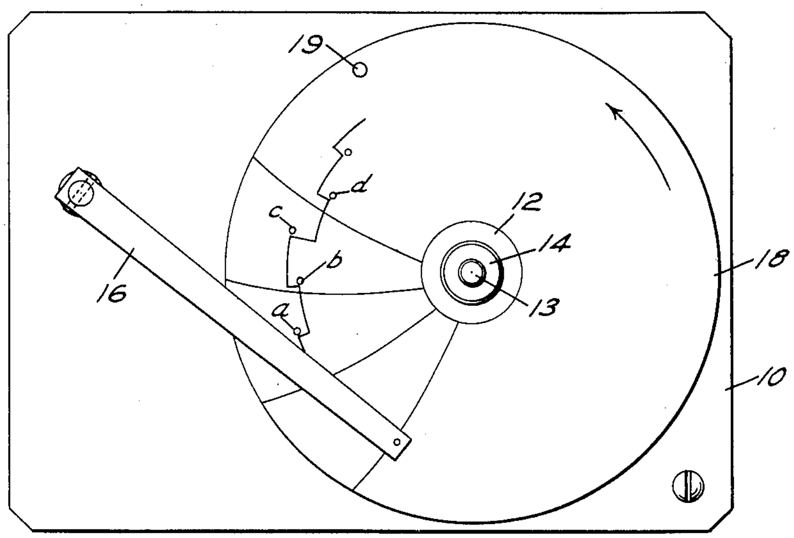
Figure 1 is a plan view of the recorder face showing the stylus arm and record card carrying plate.
Figure 2:
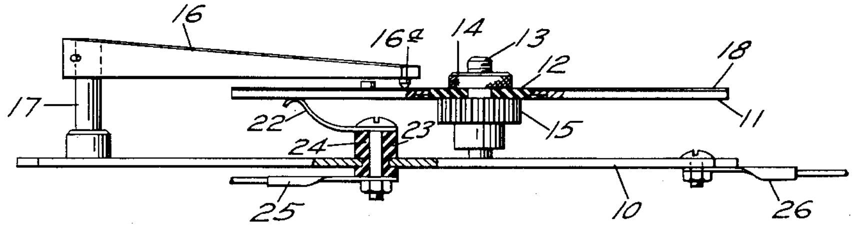
Figure 2 is an edge view with certain parts shown in section.

On the drawing the numeral 10 designates the metal bed or face plate of the recorder. Numeral 11 designates the rotary card plate which, like the bed plate, is made of any metal capable of acting as an electrical conductor and consists of an annular body fixed to a hub portion 12 of non-conducting material. The hub 12 is fixed to the end of drive shaft 13 by means of the finger nut 14 which clamps the hub 12 against a spur gear 15 forming an element of the actuating mechanism (not shown) for the stylus arm, the free end of which moves gradually toward the center of the card plate. The stylus arm 16 is mounted on the end of a shaft 17 in a manner to permit it to be rocked vertically against light spring pressure urging its free end toward the card plate 11. The stylus arm 16 carries a metal marker point 16*a* which, through rotation of the card plate, as indicated by the arrow on Figure 1, normally travels in a spiral path over a record card 18 of cardboard or other insulating material. The record card 18 engages the edge of hub 12 and is positioned and held against movement with respect to plate 11 by a pin 19 on the periphery of card plate 11 which engages in a complemental hole in the card 18.

Figure 3:
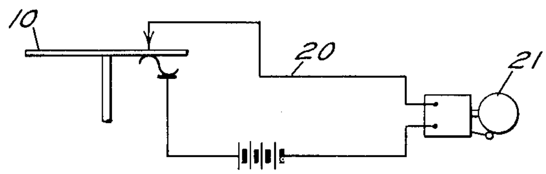
Figure 3 is a diagrammatic view of the alarm circuit and associated card plate.

Aside from the insulation introduced between drive shaft 13 and card plate 11, the structure above described is that of the prior application for patent above cited. The present invention involves the further addition to said structure of an auxiliary circuit 20 with contacts located at opposite sides of card plate 11 and including an alarm such as a bell 21, as shown diagrammatically by Figure 3. The contact at the under side of plate 11 preferably consists of a spring shoe 22 secured by a bolt 23 to an insulating post 24 on base plate 10. One terminal, 25, of circuit 20 is connected to bolt 23 while the other terminal, 26, is connected to the base plate 10 thereby including shaft 17, stylus arm 16 and point 16*a* in the circuit. Any contact of point 16*a* with plate 11 will, therefore, close the circuit and actuate the alarm bell 20.

In the practice of the present invention, the record card 18 is formed with a series of perforations (Figure 1) disposed in the path of the spiral line to be traveled by the point 16*a*. These perforations are so spaced in said line with relation to the rate of rotary movement of the card as normally to be reached by point 16*a* at predetermined intervals of time and are laid in paths of the spiral offset from one another distances corresponding to the deviation movement or movements that may be imparted to the stylus arm. Therefore, abrupt lateral displacement or deviation of the stylus arm inward just prior to arrival of perforation "*a*" (Figure 1) will bring it in the path of perforation "*b*." Opposite deviation prior to arrival at "*b*" will bring the point 16*a* to the path in which perforation "*c*" lies and the next (amplified) deviation brings it to that of perforation "*d*," etc. The foregoing example is based on a recorder having means for producing three different deviations of the stylus arm, here shown as first inward, then outward and again inward to an extent amplified over the first deviation. Thus, signals distinguishable from one another can be received from separate stations or check points.

For illustration, it may be assumed that the stations will report in order at intervals through closing of electric switches which will cause the stylus arm deviations described. The perforations *a*, *b*, *c*, etc. will accordingly be spaced on the lines of travel somewhat beyond the point to be reached by the stylus point at the expiration of each interval, the distance of the perforation beyond such point being equivalent to a time interval of, say, five or ten minutes. If the station does not report before perforation "*a*" is reached, point 16*a* will contact plate 11 through said perforation and the alarm 20 will be sounded. If the station reports at the fixed time, deviation of the point **16*a*** to the path in which perforation "*b*" lies will avoid sounding the alarm at "*a*" and set the point for sounding at "*b*" unless the station report shifts the point **16*a*** into the path of perforation "*c*," etc. While the mode of operation described is in connection with a stylus arm having two distinguishable deviations, it will be obvious that an equivalent disposition of perforations would effect like results where other numbers of deviations are to be provided for.

Accordingly, the invention provides a simple and efficient device for detecting and announcing failure of a guard station, or the like, to register a report at a predetermined time and at predetermined intervals on a recorder of the type to which the invention relates.

Modifications in details of construction are obviously possible within the scope of the invention as claimed.

What is claimed is:

1. In pattern-controlled circuit-closing apparatus, a plate, a contact point, a perforated insulator interposed between said plate and said point and movable in a particular pattern relative to said point, the contact point being movable into and out of engagement with the face of the plate in a first direction transverse to the face of the plate and being movable in a second direction parallel to the face of the plate and transverse to the movement of the insulator, and means for controlling the establishment of electrical continuity between said plate and said point through said perforations including mechanism for progressively feeding said insulator in the particular pattern with respect to said point and mechanism for producing controlled intermittent movements of said point with respect to said insulator in the second direction.

2. Pattern-controlled circuit-closing apparatus according to claim 1, in which the contact point is a scribing stylus for producing a graph on the face of said perforated insulator by relative movement between it and said stylus.

3. In pattern-controlled circuit-closing apparatus, a rotatably mounted plate, a contact point mounted for movement into and out of contact with a face of said plate in a first direction transverse to the face of said plate and for movement in a second direction parallel to the face of said plate and transverse to the rotary movement of said plate, a perforated insulator positionable on the face of said plate for rotation therewith, and means for controlling the establishment of electrical continuity between said plate and said point through said perforations including drive mechanism for rotating said plate and control mechanism for producing intermittent movements of said contact point in the second direction.

4. Pattern-controlled circuit-closing apparatus according to claim 3, including means operable by said drive mechanism for producing progressive movement of said point in the second direction.

5. Pattern-controlled circuit-closing apparatus according to claim 3, in which the contact point is a scribing stylus for producing a graph upon the face of said perforated insulator by relative movement between it and said stylus.

6. Pattern-controlled circuit-closing apparatus according to claim 4 in which the contact point is a scribing stylus for producing a line on the face of said perforated insulator by relative movement between it and said stylus.

7. In combination, a rotatable plate, an insulating sheet positionable on said plate, there being a plurality of perforations at particular positions in said sheet along substantially a spiral configuration, a contact movable in a first direction parallel to a face of said plate and transverse to the rotary movement of said plate in accordance with the rotary movement of said plate and movable through particular distances in the first direction to avoid said perforations upon the timely occurrence of independent acts, means for pressing the contact against the sheet to establish an electrical continuity between the contact and the plate upon a disposition of the contact in coincidence with one of the perforations, a perceptory indicator, and electrical circuitry including the plate and the contact for actuating the indicator upon the establishment of electrical continuity between the plate and the contact.

8. In combination, a plate, a sheet movable on said plate in a particular pattern, there being a plurality of perforations in the sheet at particular positions related to the movement of the sheet in the particular pattern, a contact point engaging the sheet for movement through the sheet in a first direction transverse to the sheet to establish electrical continuity with the plate upon coincidence of one of the perforations with the contact point, means operative to produce a movement of the contact point in a second direction parallel to the sheet and transverse to the sheet movement to direct the contact point towards the perforations, means operative upon a timely occurrence to produce a movement of the contact point in the second direction out of the path of an approaching perforation, and means including the contact point and the plate for providing a perceptory indication upon the establishment of electrical continuity between the contact point and the plate.

References Cited in the file of this patent

UNITED STATES PATENTS

| | | |
|---|---|---|
| 1,016,518 | Popp | Feb. 6, 1912 |
| 1,098,932 | Akimoff | June 2, 1914 |
| 1,138,543 | Davis et al. | May 4, 1915 |
| 1,255,968 | Williamson | Feb. 12, 1918 |
| 1,322,148 | Sprague | Nov. 18, 1919 |
| 1,980,494 | Morse | Nov. 13, 1934 |
| 2,055,031 | Hutchings | Sept. 22, 1936 |